June 14, 1938.   R. MACKAY   2,120,499
DEVICE FOR MEASURING COLOR AND LIGHT DENSITIES
Filed March 25, 1935   2 Sheets-Sheet 1

Inventor
Robert Mackay
John F Brezina
Atty.

June 14 1938.  R. MACKAY  2,120,499
DEVICE FOR MEASURING COLOR AND LIGHT DENSITIES
Filed March 25, 1935  2 Sheets-Sheet 2
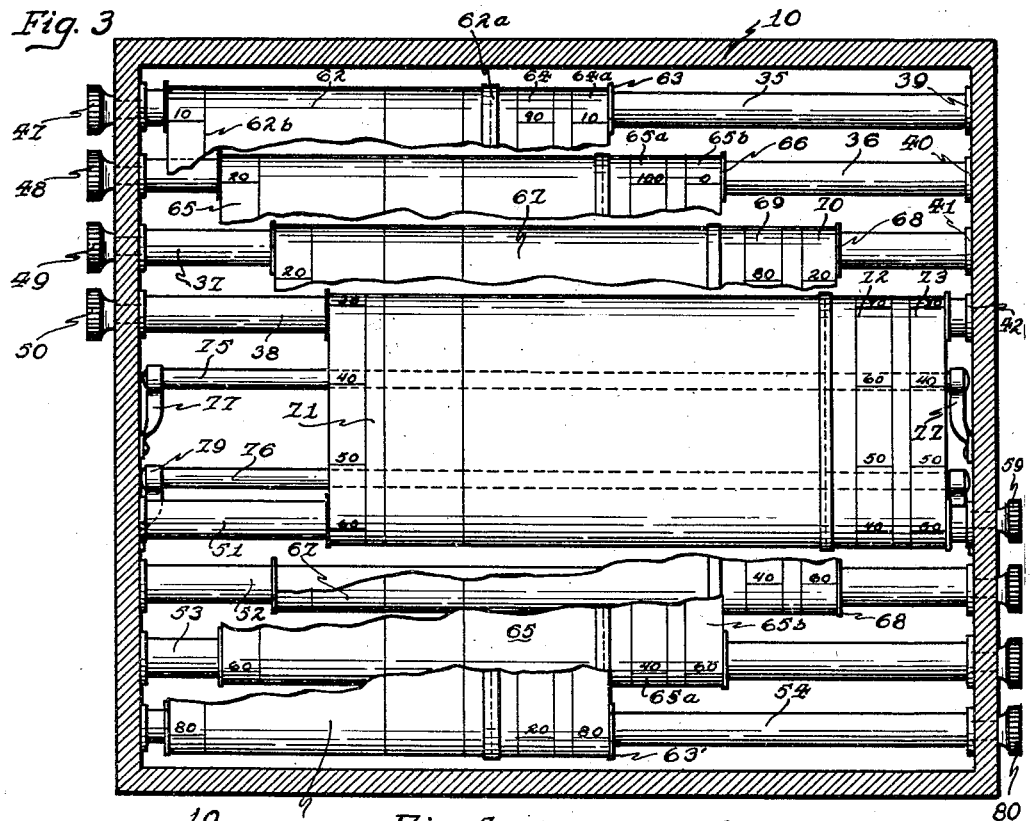
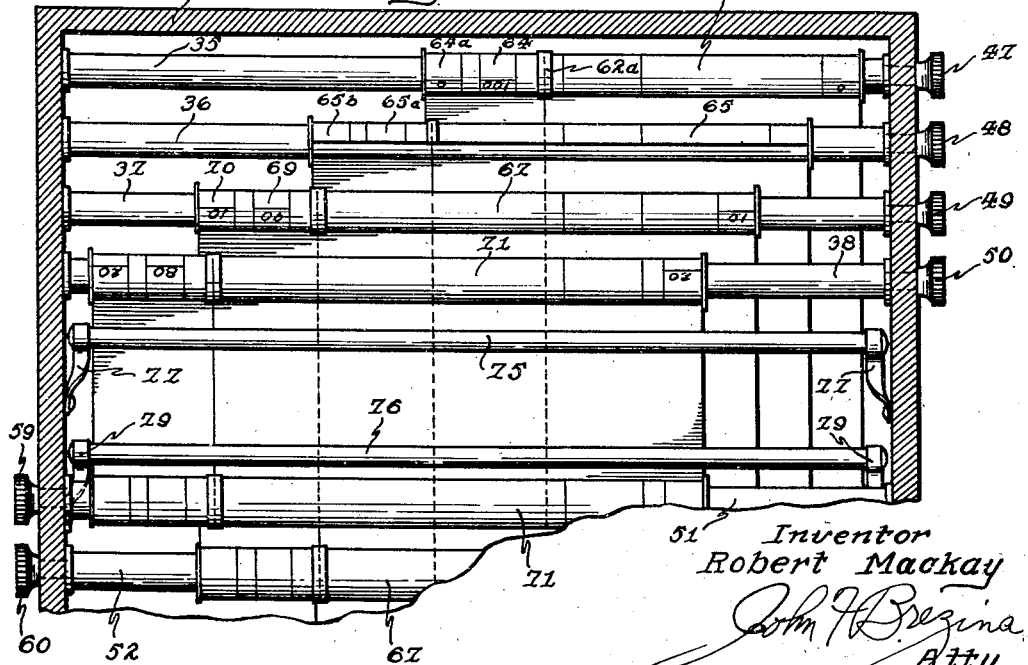
Inventor
Robert Mackay Patented June 14, 1938

2,120,499

UNITED STATES PATENT OFFICE 2,120,499

DEVICE FOR MEASURING COLOR AND LIGHT DENSITIES

Robert Mackay, Chicago, Ill.

Application March 25, 1935, Serial No. 12,795

7 Claims. (Cl. 88—14)

This invention relates to a novel apparatus for analyzing and determining the density of a single color or a plurality of superposed colors, particularly where two or more colors have been imprinted upon the same area to produce a distinctive and artistic color blend or reproduction of various forms of artistic works frequently sought to be reproduced in the photoengraving, photogravure, lithographing and off-set color printing arts. My invention further relates to novel apparatus for quickly and efficiently using and applying novel combination of various steps to commercially reproduce photoengraving, rotogravure, lithographing and other color printing plates as will be more specifically described hereinafter.

My invention has for its object to provide apparatus for analyzing and determining to an accurate degree the density of a single color or of different colors in a given area of a work of art which is sought to be commercially reproduced by any one of the commercial methods used in the graphic arts, the definite result of such analysis and determination enabling the operator or "color finisher" to make the plates, half tones, or other like "reproduction units", used in the reproduction process, correctly and of the proper dot structure.

A further object of my invention is the provision of apparatus permitting carrying out of a process for use in connection with either relief printing, or rotogravure processes or rotogravure reproduction which will immediately and accurately indicate to the operator and user, not only the individual density of a combination of superposed colors of a given area on a given work of art to be reproduced, but will also accurately indicate the density of the negative and positive which should be employed in the making of each individual printing plate or other plate (one plate being made for each color and the successive imprinting superposed), in order to have the resultant commercially reproduced picture or other work of art of the same matched and identical color blends and color density as the original work of art being reproduced, thus insuring identical reproduction in the photographic, rotogravure or otherwise commercially reproduced copies.

A further object of my invention is the provision of devices providing means for analyzing and determining the density of an individual color or of a plurality of superposed colors borne by a work of art and simultaneously determining the size of the dot structure which it is necessary to employ in order to imprint a plurality of such superposed colors so that the copies reproduced from the respective plates, the plates being printed successively, will be identical in shading, color blend, light effects, etc., to that of the original work of art sought to be reproduced.

A further object of my invention is the provision of an inexpensive and easily operable device which includes a plurality of color bands, each band being composed of a plurality of color areas all of the same primary color and each area being of a different and uniformly colored density, and wherein each of said primary color bands is movably mounted and arranged so that portions thereof are superposed; so that any two or more combinations of color areas may be quickly and easily presented to the viewer for comparison with the area of the original work of art sought to be reproduced, and wherein uniformly scaled indicia are simultaneously presented to the viewer for indicating the respective density of color areas presented to the viewer at a given time.

A further object of my invention is the provision of a manually operable device which includes a plurality of movably mounted color bands, each color band comprising a plurality of substantially adjacent areas, each area being of a different color density of the basic primary color represented by the band as a whole, in combination with indicia for simultaneously indicating to the viewer at a remote point from the viewing window the density of either one or a plurality of color areas which are presented in adjacent position to the viewer, thereby enabling the viewer and operator to accurately match given areas of a work of art sought to be reproduced.

A further object of my invention is the provision of a device wherein a plurality of primary color bands are movably mounted for superposed adjacent presentation to a viewing window and artificial lighting means on the side of said bands opposite to the viewer, for the purpose of enabling the viewer to first match the color density or light density of a work of art being reproduced and immediately presenting indicia indicating the density of the color area or light area of the adjacent bands presented to the viewer at a given time.

A further object of my invention is the provision of apparatus usable for indicating to the viewer the proper density of each negative and positive required to duplicate a selected color, in addition to showing the actual proportions of colors required to make the selected color sought to be reproduced, such negatives and positives being usable in intaglio printing and printing processes which require use of a continuous tone negative and continuous tone positive.

Other and further important objects of my invention will be apparent from the following description and claims.

This invention (in a preferred form) is illustrated in the following specification and claims.

On the drawings:

Fig. 3 is a side elevational view of my device with the entire front panel and viewing windows removed and showing the relative position of the primary color bands and other parts.

Fig. 4 is a side elevational view with parts broken away on line 4—4 of Fig. 2 and showing the primary color bands from the rear thereof.

Figure 2:
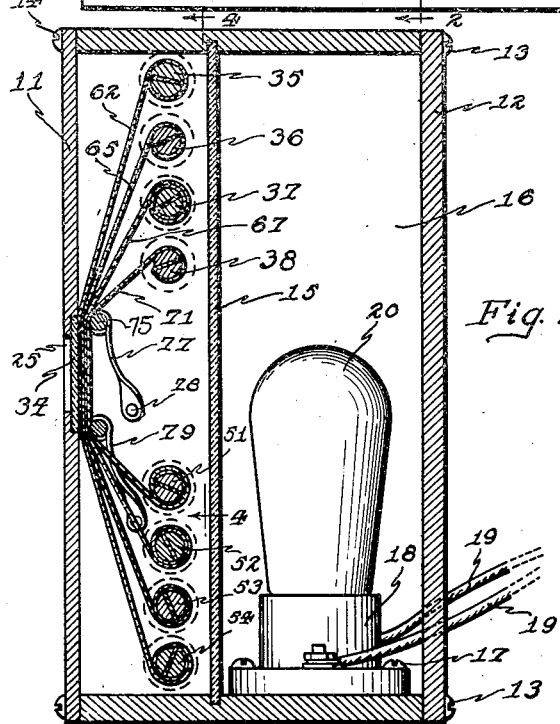
Fig. 2 is a cross sectional view taken on line 2—2 of Fig. 1.

The reference numeral 10 indicates a rectangular cabinet having removable front panel 11 and a removable rear panel 12, each of which is preferably secured to said cabinet 10 by means of suitable screws 13 and 14 respectively as shown in the drawings, particularly Fig. 2, and the removal of the front and rear panels permits access to the interior of the cabinet 10. Said cabinet may be made of wood or metal or other suitable non-transparent material. As shown in cross section in Fig. 2 the top and bottom of the cabinet 10 respectively have opposed longitudinally extending grooves at points substantially midway between the front and back of said cabinet, said grooves receiving and removably retaining therein the opposite upper and lower edges of a light filtering panel 15 which may be made of frosted glass having an opaque or corrugated surface which will diffuse and filter light from one side to the other thereof, thereby forming a rear compartment 16 as clearly shown in Fig. 2. Mounted by screws 17 on the inside surface of the bottom of the cabinet is a suitable light bulb-receiving socket 18 which may be of conventional construction and which is connected to source of electric current by wires indicated by reference numeral 19. An electric light bulb 20 of the desired voltage is removably mounted in said socket 18 in a conventional manner.

Figure 1:
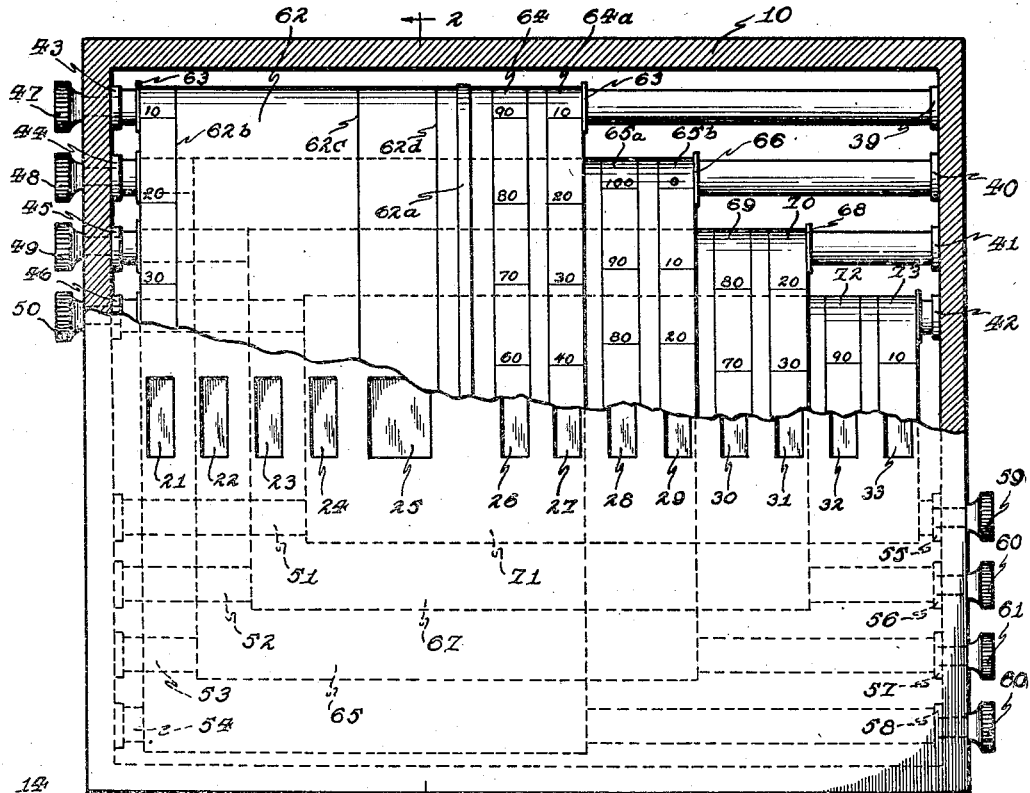
Fig. 1 is a side elevational view of my color and light analyzing device with the upper portion of the front panel thereof broken away to show the interior structure.

As shown in Fig. 1, a plurality of rectangular apertures are formed in front panel 11 in parallel substantially uniformly spaced apart relation and in a row substantially midway between the upper and lower edges of said front panel 11. As indicated in Fig. 1 the first four apertures from the left are indicated by the reference numerals 21, 22, 23 and 24 respectively. The fifth aperture and hereinafter designated the viewing window is indicated by the reference numeral 25. To the right of the viewing window 25 are parallel spaced apart rectangular apertures 26, 27, 28, 29, 30, 31, 32 and 33 respectively, all for a purpose more fully explained hereinafter. Immediately rearward and adjacent the inside surface of panel 11 is a clear glass panel 34 which extends from one end of the cabinet to the other and which forms a closure and window for each of the aforesaid rectangular apertures as clearly shown in Figs. 1 and 2, said glass panel 34 being suitably secured in such described position.

A plurality of horizontal rotatable shafts 35, 36, 37 and 38 respectively; preferably four in number, are mounted in vertical alinement and for rotative engagement with respect to said cabinet 10, one end of each of said shafts terminating immediately adjacent one end of said cabinet 10 (at right of Fig. 1) and being suitably journaled for rotative engagement in suitable apertured bushings 39, 40, 41 and 42 respectively. The opposite end of each of said shafts is suitably journaled in bushings 43, 44, 45 and 46 respectively, which in turn are mounted in apertures formed in the end of the cabinet 10 as clearly shown at the left of Fig. 1. Said end of each of said shafts extends through and projects from the outer surface of the left hand end panel of cabinet 10 and said projecting shaft ends have secured thereon knurled knobs 47, 48, 49 and 50 respectively, to provide for the convenient manual and selective rotation of said shafts at will.

A plurality of horizontal shafts, preferably four in number, indicated by reference numerals 51, 52, 53 and 54, are mounted in parallel spaced apart relation and in vertical alignment in the lower part of said cabinet 10, one end of each said shafts (at left of Fig. 1) being suitably journaled for rotative engagement in bushings 55, 56, 57 and 58, which in turn are suitably mounted in one end of cabinet 10 as shown at the right of Fig. 1, the opposite end of each of said shafts is reduced and journaled in bushings identical to 55 to 58 inclusive, which are secured in left hand end of cabinet 10. The right hand ends of said shafts extend through and project from the cabinet on the outside of the cabinet. Knurled knobs 59, 60 and 61 and 80 are secured on reduced projecting ends of said shafts 51, 52, 53 and 54 respectively to provide for convenient and selective manual rotation thereof.

As clearly shown in Figs. 1, 2 and 3 the uppermost shaft 35 and the lowermost shaft 54 have wound thereon opposite ends of a relatively long flexible band or belt 62, which is preferably composed of a transparent film similar to that used in photography. Said film belt 62 has its opposite ends wedged in longitudinal diametrically extending recesses. One of said recesses is formed in shaft 35 and the other in shaft 54 as clearly shown in cross-section in Fig. 2, this preventing complete detachment of either end of the belt 62 when it is wound in the opposite direction. Flanges 63 are mounted on shaft 35 to guide said belt when the same is wound or unwound. Similar guide flanges 63' are mounted for similar purpose on lower shaft 54.

Belt 62 is composed of two separate strips of transparent film and which are attached together along their adjacent edges by a binding adhesive tape or strip 62a.

Belt 62, which is designated the yellow color band, has along its edge adjacent the cabinet wall a plurality of substantially rectangular adjacent vertically alined areas, each area extending to the right a short distance, the edge of said yellow area being indicated by the reference numeral 62b, which line 62b is substantially opposite a point midway between viewing windows 21 and 22. Each of the yellow areas on belt 62 viewable through window 21 is of a different shade and density of yellow and is transferred to the transparent film belt 62 by a transfer of the colored pigment, corresponding to printing inks, from the actual photographic film negative. More specifically, the uppermost area of said row of color areas on said band 62 has a density of ten percent yellow color; the second and next lower area has a twenty percent density of yellow; the third has a thirty percent density of yelow, and so on so that each next adjacent area has a color density ten percent greater in the same color as the one immediately above it, there being ten such areas. The density color designated by percentage as indicated is of the same density and standard as known in the color reproduction art as applied to particular areas of color pictures, etc.

A similarly alined row of yellow areas of varying densities is borne by belt 62 upon areas thereof viewable through window 25, namely, between the vertical lines 62c and 62d, each of the respective areas being correspondingly positioned with respect to the areas at the left edge of belt 62.

The right hand portion of the belt 62, which is viewable through windows 26 and 27 is composed of a negative film portion 64 opposite window 26 from which the yellow areas of belt 62 are transferred. The adjacent integral strip of positive film 64a viewable through window 27, is the positive photographic film made from negative strip 64. The positive strip or portion 64a which is viewable through window 27, has indicia to indicate density, which indicia are placed identically and in corresponding positions to the percentage indicia at the extreme left of said color belt 62. The negative vertical strip or portion 64 of belt 62, which is viewable through window 26, has indicia thereon to indicate the degree of light density, namely, the negative density, of the corresponding color area of band 62 immediately opposite and to the left thereof. For example, if a yellow color area of ten percent density is presented to viewing windows 21 and 25 the negative film to be employed has ninety percent light transparency, the positive film shows ten percent positive film to be employed in the process for reproducing the particular shade of yellow then presented to the viewer.

Belt 65, which is the red color band of flexible film material, has its opposite ends attached to and wound upon shafts 36 and 53 respectively, said color band 65 being immediately below and behind color band 62. Red color belt 65 has two rows of areas of red, one vertical row of red areas being at the left of said belt and viewable through window 22, and the second vertical row of red areas being viewable through window 25, the portions between said two rows of red areas being transparent photographic film. Each area in each row is of different density, namely, the first and uppermost being of ten percent density of red, the second and next adjacent being of twenty percent density, the lowermost area thereon being of one hundred percent density of red. Said red color band 65 is so positioned and guided for rotative movement on its shafts 36 and 53 respectively by means of guide flanges 66 so that the left row of its areas of red color of different densities is presented to and viewable through window 22, and its other parallel row is viewed through window 25.

The right hand portion of said red color belt 65 has secured thereto by means of a suitable adhesive binding strip the photographic negative film belt 65a and immediately adjacent corresponding positive film 65b, said belts being of the same length and similarly attached upon aforesaid rotatable shafts 36 and 53. The negative portion 65a of said belt is viewable through window 28 and the positive portion 65b is viewable through window 29.

In like manner and as explained in respect to the yellow color band the density of a given red area of said density is readable through window 22 and simultaneously there will be presented the corresponding and proper light density area with its indicia through negative window 28, also simultaneously presenting the proper and corresponding positive light density and indicia through window 29. The presentation of the color area desired through window 22, which is matched by the operator with the color area of the work of art sought to be reproduced, thereby gives instantly to the operator the proper light density of the negative to be employed and the proper light density of the positive to be employed in order to correctly and accurately reproduce the color area of a given work of art.

Reference numeral 67 is the blue color belt which has its opposite ends releasably attached to upper shaft 37 and lower shaft 52, which places said belt as the third in position and in such a position that the extreme edge to the viewers left looking at Fig. 1 or 3 is maintained immediately to the left of window 23, said belt extending to the right to a position immediately to the right of window 31. Said belt 67 is guided for vertical movement by suitable guide flanges 68 which are similar in construction to flanges 63 and 66, all of which are shown in Fig. 3. The blue color belt 67 consists of flexible photographic film material having on the left hand edge thereof and viewable through window 23, a vertical row of ten different adjacent color areas of blue, each area being of a different density of blue and more particularly the uppermost being ten percent density of blue, the second being twenty percent density of blue; the third being thirty percent density of blue, and so on, the last and lowermost area being solid blue or one hundred percent density of blue. A second vertical row of adjacent blue areas, of identical densities in corresponding horizontal planes is borne by belt 67 at a position viewable through window 25.

The right hand portion of belt 67 is composed of a vertical negative photographic film strip 69 extending from one end of said belt to the other and secured to color belt 67 by suitable binding tape (not shown), said negative being viewable through window 30, and the outer edge of belt 67 is composed of integral positive photographic film strip 70 which is reproduced from strip 69. As stated before, negative film strip 69 has indicia thereon so positioned as to indicate the proper light density to be used in the making of the negative film to accurately correspond to and reproduce the particular blue color area which is viewed through window 23. Likewise the positive strip 70 has indicia properly placed thereon to show the correct light density of each area of the film strip and which is to be used in process of producing the halftones or printing plates which in turn will reproduce the particular area and density of blue which has been matched and viewed through window 23. The fourth and innermost belt 71 is the black color belt which has one end attached and windable upon upper shaft 38 and its other end attached to and windable upon lower shaft 51. Belt 71 is constructed similarly to the yellow, red and blue belts before described and has along its left hand edge, and viewable through window 24, one row of adjacent light color areas in vertical alignment, the uppermost color area being of ten percent density of black; the next adjacent black color area being of twenty percent density of black, and so on gradually, the lowermost color area being of one hundred percent density of black. A second vertical row of black color areas is borne by belt 71 at a position so that same is viewable through window 25, said areas being of density and horizontal position corresponding to said first mentioned row of black areas.

The right hand portion of belt 71 comprises a photographic negative film strip 72 which has its edge secured to the adjacent edge of belt 71 by a suitable binding strip, (not shown), and which extends from one end of the belt to the other and which negative portion is composed of a plurality of photographic negative areas, each of different light density, the uppermost being one hundred percent negative density, the next adjacent being ninety percent negative density, and so on, the lowermost of the ten areas having no black color whatever and its density being indicated by zero. The outer and right hand edge portion of black belt 71 is composed of a photographic positive strip 73 which is made from negative strip 72 and which extends from one end of the belt to the other and which has ten adjacent areas of positive film each of different light density, the density of the uppermost being zero, the next adjacent being ten percent positive light density, the third being twenty percent positive light density, and so on, the lowermost being one hundred percent positive light density.

As clearly shown in cross sectional view of Fig. 2, I provide a pair of spaced apart parallel tension rods 75 and 76 respectively which extend from one side wall of the cabinet to the other, these rods being adapted to hold a portion of each of the color and photographic film belts in a position immediately adjacent the respective viewing windows heretofore described, as clearly shown in Fig. 2. Tension rod 75 has its ends secured in corresponding eyelet ends of resilient springs 77 which preferably are of clock spring steel which extend outwardly and have their respective opposite ends secured to the respective opposite ends of cabinet 10 by means of suitable screws 78 as shown in the drawings. Tension rod 76 is likewise mounted, having its ends secured in eyelet ends of a pair of tension springs 79 whose lower ends are likewise secured to the cabinet wall by a suitable screw. It will be noted that the position of the rods is such that a portion of the respective color and photographic film belts will be held substantially flat against the entire area of the respective viewing windows in front of the cabinet.

Having described the structure of the preferred form of my device and its quick and convenient operation, it will be apparent from the foregoing that I have provided an entirely novel device or apparatus for determining and measuring the density of color, as well as the density of light of various works of art and for quickly presenting to view nearly five thousand combinations or tones of color for quick comparison with works of art, and for quick indication and disclosure of both the density of respective colors to be employed and of the correct density of the negative which is to be employed in the printing plate producing process which will correctly reproduce the density of respective colors or tone of colors desired. I am aware that numerous details of construction may be varied in wide range without departing from the principles of my invention and I do not desire my invention to be limited to the particular form described in the foregoing.

I claim as my invention:

1. In a device of the class described for ascertaining the densities of colors in a work of art, a cabinet; a light source in said cabinet; a plurality of spaced apart substantially horizontal shafts rotatably mounted in said cabinet; said cabinet having a plurality of spaced apart windows in substantial horizontal alignment in its forward wall; a plurality of flexible bands in said cabinet, each of said bands having its opposite ends attached to and windable upon two of said spaced apart shafts, each of said bands bearing vertically aligned transparent color areas of graduated densities, said transparent color portions of all said bands being superimposed, the color areas constituting said superimposed band portions being adapted to be selectively positioned adjacent to and for view through one of said windows; indicia on each band for indicating the densities of said color areas and viewable through other of said spaced apart windows; each of said bands having mounted adjacent one edge thereof a negative film band having a plurality of vertically aligned negative areas of known, graduated light densities, a positive film band mounted on each pair of shafts adjacent each of said negative film bands and adapted to move parallel with said color band and said negative film band, said positive film band having in vertical alignment a plurality of positive film areas of varied light densities; indicia adapted to be disposed before certain of said windows on each of said negative portions and on each of said positive portions indicating the densities of said respective film areas simultaneously presented to view, and means for manually and selectively moving said bands to present desired color areas or combinations of color areas to view, the selective rotation of said shafts permitting selective superpositioning of the various color areas on said superimposed band portions to cause the selected superimposed color areas to present to view a desired blended color area, each color area on said color bands being in horizontal alignment with negative and positive film band areas which film band areas indicate the desirable film used in reproducing such horizontally aligned color area.

2. In a device of the class described for ascertaining the densities of respective colors in a work of art, a cabinet; a plurality of spaced apart shafts rotatably mounted in said cabinet; said cabinet having a plurality of spaced apart windows in substantial horizontal alignment in one wall thereof; a plurality of flexible bands in said cabinet, each of said bands having its opposite ends attached to and windable upon two of said spaced apart shafts, each of said bands bearing a plurality of adjacent vertically aligned transparent color areas of graduated densities, the color areas of said bands being positioned behind a plurality of said windows, a portion of all the color areas of each band being superposed over the color areas of the other bands and so positioned as to be presentable to view through one of said windows; indicia on the non-superposed portion of each band for indicating the densities of the respective color areas in horizontal alignment therewith, and means for manually and selectively moving said bands to selectively position desired color areas to view before one of said windows and to simultaneously present said indicia to view before another of said windows.

3. In a device for measuring the densities of respective color areas of a work of art and for determining the density of film to be employed in reproducing said color areas, a cabinet; a plurality of spaced apart rotatable shafts mounted in said cabinet in parallel and horizontal relation, one-half of said shafts being in the upper part of said cabinet and the other half below the same; a plurality of spaced apart horizontally aligned viewing windows in the front of said cabinet; a plurality of belts, each belt having one end attached to one of said upper shafts and the other end attached to one of said lower shafts, each of said belts having a plurality of color areas of varying color density, all areas on the same belt being of various densities of the same color, said belts being disposed behind said windows respectively; all of said belts having one side portion in superposed overlapping position relative to each other and disposed behind one of said viewing windows, each successive belt from the foremost to the rearmost having the opposite side portion extended a greater distance than the forward adjacent belt, indicia on the extended portions of each of said belts indicative of the density of the color area in horizontal alignment on the same belt, the selective rotation of said shafts permitting selective positioning of desired superposed color areas before one of said windows and simultaneously positioning the indicia-bearing belt portions before other of said windows.

4. In a device for measuring the densities of respective color areas of a work of art and for determining the light density of film to be employed in reproducing said color areas, a cabinet; a light in said cabinet; a plurality of spaced apart rotatable shafts mounted in said cabinet in parallel and substantially horizontal relation, one-half of said shafts being in the upper portion of said cabinet and the other half therebelow; a plurality of spaced apart substantially aligned viewing windows in the front of said cabinet; a plurality of belts each having one end thereof attached to one of said upper shafts and the other end attached to one of said lower shafts, each of said belts having a plurality of adjacent vertically aligned light pervious color areas of graduated densities said belts having their color area portions in superposed relation, said superposed belt portions being positioned behind one of said windows, each of said belts having another portion positioned behind another of said windows, indicia on said last-mentioned portion of each of said belts indicative of the densities of the color areas in horizontal alignment therewith and borne by the same belt; said belts being selectively movable to present any of the color areas of one or more of said belts to view through one of said viewing windows and to simultaneously present before other of said windows the indicia indicative of the densities of the color areas positioned behind another of the viewing windows.

5. In a device for ascertaining the color densities of colors in a work of art, a plurality of flexible windable bands mounted for longitudinal movement adapted to be selectively moved to present portions thereof at certain viewing points; each band comprising a color bearing portion and an integral laterally extending side portion the color bearing portions being in superposed relation; a plurality of aligned primary color areas on each of said windable flexible bands, each area being of different and known density; indicia on the laterally extending portion of each of said bands to indicate the color density of the aligned color areas respectively; a plurality of shafts on which said bands are mounted for winding movement and adapted to move said bands longitudinally; means providing for selective rotation of said shafts to wind said bands to position any of the color areas of one or more of said bands at a common viewing point and to simultaneously present said density-indicating indicia to view at other viewing points; and artificial lighting means behind said bands and visible through said windows and through said color areas to facilitate matching a colored area.

6. In a device of the class described, a mounting shell having a plurality of spaced apart windows therein; a plurality of rollers journalled in said shell below and above said windows and consisting of two or more pairs of rollers; a flexible band attached to and windable on each pair of said rollers, each pair of rollers comprising one upper and one lower roller, each of said bands having a plurality of color areas of graduated densities thereon, a portion of each of said bands being superimposed upon portions of the other of said bands, said superposed portions being positioned before one of said windows, indicia on each band adjacent one edge thereof to indicate the respective densities of the color areas thereon, said indicia being simultaneously disposed before other of said windows, a flexible film band on each of said pair of upper and lower rollers, each said film band being composed of graduated negative film areas and graduated positive film areas which are horizontally aligned with color areas on said color band of corresponding densities; and indicia on each of said film bands indicative of the respective densities of the negative and positive areas of said film bands respectively, which are presented to view simultaneously with said respective color areas.

7. In a device for ascertaining the densities of colors in a work of art, a plurality of rotatably mounted shafts, a wall member having a plurality of horizontally aligned window openings, a plurality of flexible bands mounted on said shafts for winding and longitudinal movement, said bands having color portions thereof superposed; a plurality of graduated color areas on the superposed portion of each of said bands, each color area being of a known density; indicia on each of said bands to indicate the density of each of said color areas; each of said bands having a longitudinally extending portion comprising a plurality of negative film areas, each of said film areas being of a different and known density; said bands being movable longitudinally to present to view through one of said window openings and at a common point various combinations of superposed color areas, and simultaneously presenting to view through certain of said window openings film areas bearing indicia thereon; artificial lighting means behind said superposed color-bearing areas of said color bands to facilitate viewing thereof, and a flexible band secured along one lateral edge of each of said color area bearing bands and windable therewith, said flexible band having positive film areas thereon and bearing indicia to indicate the proper positive film to be used in reproducing the superposed color areas simultaneously presented to view.

ROBERT MACKAY.